United States Patent [19]

Gibney et al.

[11] 3,846,403

[45] Nov. 5, 1974

[54] PRODUCTION OF CELLULOSE ESTERS FROM PARTIALLY PURIFIED WOOD PULP BY HEMICELLULOSE REMOVAL

[75] Inventors: Kelly B. Gibney, Burnaby; Russell S. Evans, Vancouver, British Columbia, both of Canada

[73] Assignee: Canadian Cellulose Company, Limited, Vancouver, British Columbia, Canada

[22] Filed: June 21, 1973

[21] Appl. No.: 372,146

[52] U.S. Cl. ............................... 260/227, 260/229
[51] Int. Cl. ............................................. C08b 3/06
[58] Field of Search ............................ 260/227, 229

[56] References Cited
UNITED STATES PATENTS

| | | | |
|---|---|---|---|
| 2,028,080 | 1/1936 | Stern | 260/229 |
| 2,191,525 | 2/1940 | Fleischer et al. | 260/229 |
| 2,772,944 | 12/1956 | Allewelt | 260/229 |
| 3,037,902 | 6/1962 | Fahey et al. | 260/227 |
| 3,040,027 | 6/1962 | Bates et al. | 260/227 |

*Primary Examiner*—Donald E. Czaja
*Assistant Examiner*—Ronald W. Griffin
*Attorney, Agent, or Firm*—Thomas J. Morgan; Robert J. Blanke

[57] ABSTRACT

In the preparation of a solution of cellulose acetate by esterifying cellulose with acetic anhydride in acetic acid to form a solution of cellulose acetate in acetic acid, the improvement which comprises using as the cellulose source wood pulp which has been only partially purified but still contains at least about 5 percent by weight of hemicellulose. The hemicelluloses preferentially esterify so the reaction is interrupted after a few minutes and the solution containing the dissolved hemicellulose ester is separated from the undissolved, largely hemicellulose-free pulp. Additional acetylation medium is added and esterification resumed to completion. The hemicellulose acetate solution may optionally be blended in at this stage. The resulting cellulose acetate can be used in fiber extrusion without rapidly clogging filters and spinnerettes used in such operation so that there is a long time interval between shut-downs for filter and spinnerette replacement.

7 Claims, No Drawings

PRODUCTION OF CELLULOSE ESTERS FROM PARTIALLY PURIFIED WOOD PULP BY HEMICELLULOSE REMOVAL

The present invention relates to the production of high quality solutions of cellulose esters from low quality sources.

Cellulose esters of organic acids are useful for a variety of purposes. Principally cellulose acetate is used for production of fibers although it is also used in large amounts for production of plastic sheets, films, moldings, adhesives and the like. Cellulose propionate is especially suited for moldings as are cellulose acetate-butyrate.

A standard way of making the foregoing end products is to esterify cellulose with a solution of the anhydride of the acid whose ester is to be produced dissolved in the corresponding acid so that the resulting ester will form a solution in the acid. The resulting solution can be used as such to produce fibers or films by extrusion into air or water, but the standard procedure is to spray the solution into a solvent for the acid which is a non-solvent for the dissolved ester, whereby the ester precipitates in a flaky form. Thus, water is the precipitant normally employed. The cellulose ester flake is then washed, dried and stored. It may subsequently be melted and thus used for fiber and film production or, far more often, it is dissolved in a volatile solvent such as acetone or methylene chloride-methanol and extruded into an evaporative atmosphere wherein the solvent is evaporated.

In carrying out the ultimate extrusion in production of fibers, for example, the solution is extruded through a spinnerette or jet provided with many minute orifices less than 1 mm and usually less than 0.050 mm in diameter. If these holes become clogged in whole or even in part the quality of the product will suffer markedly. It is accordingly customary to place upstream of the spinnerette one or more filters to remove any materials which might otherwise clog the spinnerette. These filters are usually replaced when the pressure drop across them reaches some pre-determined level before the filters fail or extrusion is unintentionally interrupted. The replacement of the filter necessitates interruption of the extrusion operation with obvious loss of productive capacity and additional time is lost in bringing the system to steady state after start up.

Examination of the material clogging a filter has revealed it is essentially non-cellulosic and, accordingly, it has been the practice to use cellulose sources which are as free as possible of non-cellulosic impurities. To this end the best source of cellulose is cotton linters but this is relatively expensive and of limited availability.

One of the most widely available cellulose sources is wood pulp, i.e., the residue after de-lignification of wood. Standard paper grad pulps produced by the Kraft, sulfite or other pulping techniques have too high a content of non-cellulosic material and thus special pulping and purification techniques, e.g., prehydrolysis, chlorination, alkaline refining, are required to produce an acetylation grade pulp. The additional purification steps add to the cost of the pulp and reduce the amount of material as a result of purification losses so that the products are increased in cost; obviously the by-products produced are a potential source of pollution and thus present a disposal problem.

It is accordingly an object of the present invention to produce fiber grade cellulose esters from low cost cellulose sources by a simple inexpensive technique.

It is a further object of the invention to produce fiber grade cellulose esters in high yield from such low cost cellulose sources.

These and other objects and advantages are realized in accordance with the present invention which relates to an improvement in the standard process for the production of a solution of a cellulose lower alkanoate wherein cellulose is subjected to esterification with a lower alkanoic acid thereby to form said cellulose lower alkanoate dissolved in said acid. The departure herein comprises employing as said cellulose source cellulose having a hemicellulose content in excess of about 5 percent by weight, interrupting the esterification when the hemicellulose content of the still undissolved cellulose source has fallen to less than about one-half its initial value, filtering the reaction mass to remove therefrom the solution, adding fresh anhydride and acid to the filtration residue, and continuing the reaction, whereby the resulting solution is characterized by a performance during subsequent processing comparable to that of initially more pure cellulose sources.

Our investigations have revealed that the principal impurities of a bleached but non-alkaline refined raw sulfite pulp, for example, are hemicelluloses such as xylan and mannan. The ultimate filterability of cellulose ester solutions was dependent upon the initial hemicellulose content; thus the quality of fiber produced by extrusion and the length of time between filter changes were also dependent upon the hemicellulose content of the cellulose source. We further found that the hemicelluloses esterified more rapidly than the cellulose so that the dissolved esters after only a brief reaction interval were disproportionately high in hemicelluloses and the undissolved pulp was disproportionately low in hemicelluloses. Thus, by removing the solution at this stage, the undissolved residue could then be reacted with further esterification mixture to produce cellulose ester solution of as high a quality as that obtained from initially much more pure cellulose sources.

Further investigation revealed that it was not actually the hemicellulose esters which clogged the filter, but rather some complex of hemicellulose-cellulose esters. These apparently formed as a result of the presence of the hemicellulose esters during the formation of the cellulose esters. On the other hand, if hemicellulose esters are added to cellulose esters which have already advanced to the state of solubility, then the solution retains its high filterability.

Accordingly, in accordance with a preferred embodiment of the present invention the hemicellulose ester solution which is withdrawn from the pulp residue after the interrupted esterification is added to the cellulose ester solution which results when the final esterification is substantially complete. In this manner the hemicellulose content is not lost, resulting in a higher yield of cellulose ester per pound of raw wood pulp.

In practicing the invention the cellulose source may be a partially purified wood pulp made by any standard procedure, especially the sulfite process. Advantageously it has undergone a bleaching treatment to improve its color but not as extensive an alkaline refining such as is normally required to reduce the hemicellulose content. The hemicellulose content which, in conventional acetylation grade pulps, must be less than about 5 percent and usually less than about 3 percent, may thus be much higher than about 5 percent, even as high as about 8 percent, 10 percent or even more.

The acid and anhydride of the esterification may be any lower alkanoic acid or anhydride, e.g., acetic, propionic and/or butyric acids and their anhydrides; acetic acid and its anhydride are preferred. The composition of the esterification mix is more or less conventional and may range from about 0.05 to 10 parts by weight of anhydride per part by weight of acid, one additional mole of acid being formed for each mole of anhydride which reacts.

The esterification mix is employed in an amount relative to the pulp which may vary widely, depending upon the amount of hemicellulose removal it is desired to effect in the initial step. Thus, for example, with a pulp which has a hemicellulose content of about 8 to 12 percent by weight to reduce the hemicellulose content of the undissolved pulp residue to below about 3 percent by weight, a ratio of about 25 to 4 parts by weight of acid-acid anhydride mix per part by weight of pulp has proved quite suitable. On another basis, the preferred ratio of acid anhydride is about 5 to 30 times the molar proportion of the hemicellulose it is desired to dissolve away during the initial treatment.

The composition of the acid and anhydride and its proportion during the final esterification are conventional and the amount of make-up acid and anhydride required will depend upon the amount which is lost during the filtration to remove the hemicellulose esters.

A catalyst such as sulfuric acid, phosphoric acid, trichloracetic acid or the like is preferably employed during esterification in standard amount, e.g., about 0.05 to 0.20 part per part by weight of wood pulp. Prior to esterification, the raw wood pulp preferably has undergone a pretreatment with acid, possibly even in the presence of catalyst but without the anhydride or otherwise under conditions which will not result in esterification.

The duration of the first stage esterification will depend upon the initial hemicellulose content and its desired final content, the anhydride ratio, the temperature, and the like. About 3 minutes or less under standard esterification conditions has been found adequate to reduce the hemicellulose content of wood pulp from an initial value of more than 8 percent to less than 3 percent, e.g., only little more than 2 percent.

The separation of the dissolved hemicellulose ester is generally effected merely by draining, although squeezing of the undissolved pulp may also be utilized. If the dissolved hemicellulose ester is to be recombined with the final cellulose ester solution it should be effected after esterification is substantially complete, i.e., after at least about 95 percent of the cellulose has dissolved.

The resulting cellulose ester solution, optionally containing hemicellulose ester, may then be treated in conventional manner as by neutralizing the sulfuric acid catalyst, adding water to convert any residual anhydride to acid, ripening to hydrolyze any sulfuric acid ester bonds and/or to reduce the esterification degree from the theoretical maximum of 3 ester groups per anhydroglucose unit to some lower value which will determine the solubility, thermal properties and crystallographic properties of the ester. The solutions may then be extruded as such to form fibers, i.e., direct spinning, but they are preferably sprayed into a body of water in conventional manner to form a lacy flake which is dried and stored prior to subsequent dissolution in a more suitable solvent for extrusion, e.g., acetone for hydrolyzed cellulose esters and alkyl halide/alkanol such as methylene chloride/methanol for cellulose esters having almost 3 ester groups per anhydroglucose unit.

The invention will be further illustrated in the following examples wherein all parts are by weight unless otherwise expressed.

EXAMPLE 1 a. Wood pulps A and B, representing respectively a commercial acetylation-grade sulfite pulp and a raw sulfite acetate pulp which was chlorinated for color improvement, but not purified by alkaline refining, are acetylated by a conventional process. This process involves activation of 10 parts pulp having 6 percent moisture with 3.5 parts acetic acid for a minimum of 2 hours at 23°–25°C. Acetylation is accomplished by treatment of the activated pulp with 30 parts acetic anhydride in 300 parts acetic acid solvent with 1.4 parts sulfuric acid as catalyst. The reaction is carried out at 35°C with stirring. When the pulp fibers are dissolved and solution viscosity drops to target level, indicating esterification has proceeded to the desired extent, the reaction is terminated. The solution quality is assessed by measuring the filterability in milliliters by pressure filtration through a 5 micron filter and the weight in milligrams of residue recovered by centrifugation.

In the two-stage acetylation of pulp B, after three minutes of reaction, the acetylating liquid medium is withdrawn from pulp B by vacuum filtration. Washing with fresh acetic acid solvent can effect additional beneficial removal of residual soluble hemicellulose acetates. Fresh acetylation medium containing 30 parts acetic anhydride, 300 parts acetic acid and 1.4 parts sulfuric acid is then added to the undissolved pulp fibers (10 parts containing 7.5 parts cellulose) and esterification continued to a total reaction time of 1 hour.

b. The process of (a) with respect to pulp B is repeated with another sulfite pulp, C, of still higher hemicellulose content.

c. The results of the trials (a) and (b) are set forth in Table 1.

Table 1

| Pulp | Hemicellulose Content | | Acetylation Process | Filterability (ml) | Residue Weight (mg) |
| --- | --- | --- | --- | --- | --- |
| | % Xylan | % Mannan | | | |
| A | 1.04 | 1.31 | Conventional | 5.8 | 119.4 |
| B | 2.65 | 5.50 | Conventional | Below Index | 627. |
| | | | Two stage | 7.3 | 100.4 |
| C | 3.20 | 9.2 | Conventional | Below Index | 1014.4 |
| | | | Two stage | 2.8 | 283.6 | d. In confirmation of the results shown in (c) small samples of undissolved pulp are withdrawn during the initial esterification of pulps B and C and are analyzed with the following results:

Table 2

| Mins. of Reaction | Hemicellulose in Fibers | | | |
|---|---|---|---|---|
| | PULP B | | PULP C | |
| | % Xylan | % Mannan | % Xylan | % Mannan |
| 0 | 2.65 | 5.50 | 3.20 | 9.20 |
| 1 | 1.40 | 1.85 | 1.65 | 4.40 |
| 2 | 1.20 | 1.45 | 1.40 | 3.25 |
| 3 | 1.05 | 1.25 | 1.30 | 2.85 |
| 5 | 0.85 | 1.10 | 1.05 | 2.50 |

Table 3

| Hemicellulose Acetate Added to Cotton at Indicated Acetylation Time | Undissolved Cotton at Time of Addition, (mg) | Final Residue (mg) |
|---|---|---|
| 0 min. | 3000 | 148 |
| 15 min. | 1600 | 137 |
| 45 min. | 100 | 21.8 |
| 55 min. | 16.1 | 17.8 |
| No Addition (control) | (3000) | 16.1 | e. The products of (a) and (b) are suitable for use in making cellulose acetate fibers by neutralizing the catalyst, hydrolyzing to an acetyl value of about 55 percent calculated as acetic acid, jet spraying into water to form cellulose acetate flake, drying and then redissolving in 95 percent acetone to a content of about 27 percent by weight. The requisite frequency of filter changing is no greater with cellulose acetate made from high hemicellulose content wood pulp processed as indicated than from cellulose acetate made in conventional manner from wood pulp of lower hemicellulose content.

f. The process of (e) can be repeated except that the hemicellulose acetate solutions withdrawn from pulps B and C are added to their respective wood pulp acetylation solutions after acetylation is more than 95 percent complete. The resulting combined solutions can be used in processing to fibers without increasing the requisite frequency of filter changing.

EXAMPLE 2

In confirmation of Example 1 (f), purified cotton linters and a purified glucomannan hemicellulose from wood are employed to simulate wood pulp at various stages of conventional acetylation and the two stage acetylation. The hemicellulose is fully acetylated, dissolved in acetic acid and the solution is added to provide 2.7 percent of hemicellulose based on the weight of cotton cellulose.

Cotton linters are acetylated in standard manner in separate experiments in which the hemicellulose acetate is added, respectively, at the beginning, and after 15, 45, and 55 minutes from commencement of the reaction. The first instance simulated low purity wood pulp in a conventional acetylation, the remaining instances simulated the two stage acetylation with return of the first stage liquor early, late, and at the end of the second stage.

Final solutions are evaluated on the basis of the residue recovered by centrifugation. The results, shown in Table 3, demonstrate that the detrimental effect of dissolved hemicellulose acetate decreases as solution of cellulose progresses in the second stage. The final residue when hemicellulose acetate is added after essentially complete solution of cellulose is not significantly different from no addition of hemicellulose acetate.

It will be appreciated that the instant specification and examples are set forth by way of illustration and not limitation, and that various modifications and changes may be made without departing from the spirit and scope of the present invention.

What is claimed is:

1. In the production of a solution of a cellulose lower alkanoate wherein a cellulose source is subjected to esterification with a lower alkanoic acid anhydride in a lower alkanoic acid thereby to form said cellulose lower alkanoate dissolved in said acid, the improvement which comprises employing as said cellulose source cellulose having a hemicellulose content in excess of about 5 percent by weight, interrupting the esterification when the hemicellulose content of the still undissolved cellulose source has fallen to less than about one-half its initial value, filtering the reaction mass to remove therefrom the solution, adding fresh anhydride and acid to the filtration residue, and continuing the reaction, whereby the resulting solution is characterized by a performance during subsequent processing comparable to that of initially more pure cellulose sources.

2. The process of claim 1 wherein said lower alkanoic acid is acetic acid and said anhydride is acetic anhydride.

3. The process of claim 1 wherein the esterification is interrupted when the hemicellulose content of the still undissolved cellulose is less than about 3 percent by weight.

4. The process of claim 1 including the further step of adding the filtrate of the interrupted esterification to the solution which results when the final esterification is substantially complete.

5. The process of claim 1 wherein the cellulose source is wood pulp having a hemicellulose content in excess of about 8 percent by weight.

6. The process of claim 1, wherein the cellulose source is wood pulp, the lower alkanoic acid is acetic acid and the anhydride is acetic anhydride, and the esterification is interrupted when the hemicellulose content of the still undissolved cellulose is less than about 3 percent by weight.

7. The process of claim 6 including the further step of adding the filtrate of the interrupted esterification to the solution which results when the final esterification is substantially complete.

* * * * *